United States Patent
Gupta

[11] Patent Number: 6,086,932
[45] Date of Patent: Jul. 11, 2000

[54] HIGH ELECTRIC PASTEURIZATION

[76] Inventor: Rajendra p. Gupta, 9 Veery Lane, Gloucester, Ontario, Canada, K1J 8X4

[21] Appl. No.: 09/210,831

[22] Filed: Dec. 15, 1998

Related U.S. Application Data

[63] Continuation-in-part of application No. 08/837,910, Apr. 11, 1997, abandoned.

[51] Int. Cl.$^7$ .............................. A23L 3/005; A23C 3/00
[52] U.S. Cl. ................................ 426/237; 99/451; 99/483
[58] Field of Search .......................... 426/237; 99/451, 99/483, DIG. 14

[56] References Cited

U.S. PATENT DOCUMENTS

| | | | |
|---|---|---|---|
| 4,838,154 | 6/1989 | Dunn et al. | 99/451 |
| 5,048,404 | 9/1991 | Bushnell et al. | 99/451 |
| 5,514,391 | 5/1996 | Bushnell et al. | 426/237 |
| 5,571,550 | 11/1996 | Polny, Jr. | 426/244 |
| 5,690,978 | 11/1997 | Yin et al. | 426/237 |
| 5,758,015 | 5/1998 | Polny, Jr. | 392/318 |
| 5,776,529 | 7/1998 | Qin et al. | 426/231 |

*Primary Examiner*—Nina Bhat

[57] ABSTRACT

Pasteurization and sterilization of a flowable material such as food is performed by means of pulsed electric field. The flowable material is passed through a pair of closely spaced narrow electrodes at a high speed. The electrodes are applied with a continuous high electric potential. Because the material spends a very little time between the electrodes, it experiences a short pulse of a high electric field which electrocutes bacteria in the flowable material.

16 Claims, 2 Drawing Sheets

HIGH ELECTRIC PASTEURIZATION

This is a continuation-in-part application of Ser. No. 08/837,910 filed on Apr. 11, 1997 now abandoned.

FIELD OF INVENTION

The present invention relates to a method of and apparatus for pasteurizing a material using a strong electric field of a short duration. In particular, it is directed to a method of and apparatus for pasteurizing a flowable material by passing it between narrow highly electrified electrodes at a high speed.

BACKGROUND OF INVENTION

Pasteurization of foods is currently achieved by thermal treatment of the products to high temperatures. Such high temperatures are undesirable in many applications for they frequently lead to a degradation of the product in functionality and taste.

Pasteurization and sterilization of foods by thermal treatment have been in use for over one hundred years. Heating of a food kills the micro-organisms in the food which micro-organisms may degrade and eventually destroy the food within a short time. A reduction in the population of micro-organisms extends the shelf life of foods. Depending on the severity of thermal treatment given to the food, the shelf life may be extended many times. Other means of destroying micro-organisms or limiting their growth include irradiation, pickling, salting, sweetening, etc.

Pulsed high electric field treatment of liquid food has also been shown to kill bacteria by many researchers including the present inventor. The pulse duration of microseconds to milliseconds and field strengths of several kilovolts per centimeter have been found effective. However, the generation and application of such field have not yet been found effective and economical for industrial use.

For example, U.S. Pat. No. 5,514,391 May 7, 1996 (Bushnell) describes a process for reducing levels of micro-organisms in pumpable food products using a high pulsed voltage system. The system includes a plurality of electric field treatment zones with cooling units between each pair of treatment zones. However, in this system, the electric field pulse is generated by electrical energy storage and fast discharge of this stored energy by complex switching circuits. The electric field pulse generators are expensive in capital and operating costs, and these are not competitive with thermal devices for pasteurization.

In high electric field pasteurization, bacteria are effectively electrocuted. If an electric field is used for ohmic or joule heating of the liquid, then the electric field is just a means of developing heat in the liquid. Bacterium killing takes place as a result of this heating. The present invention uses a pulsed high electric field to treat liquid food. A high enough voltage effectively electrocutes bacterial but short duration of pulses result in no appreciable heat generation in the food.

OBJECTS OF INVENTION

It is therefore an object of the invention to provide a method of pasteurizing a flowable material by electric means, It is another object of the invention to provide an electric pasteurizer for a flowable material.

It is yet another object of the invention to provide a method for the application of pulsed electric field to a flowable material.

SUMMARY OF INVENTION

Briefly stated according to one aspect, the invention is directed to a method of electro-pasteurizing a flowable material. The method comprises steps of passing the flowable material between a pair of electrodes at a speed, sizes of the electrodes and the speed being such that in passing the flowable material remains between the electrodes for a predetermined duration of less than one second and applying a continuous high electrical potential between the pair of electrodes to create an electrical field of a predetermined magnitude such that the electric field electrocutes bacteria in the flowable material and yet produces no substantial joule heating therein.

According to another aspect, the invention is directed to an electro-pasteurization apparatus for a flowable material. The apparatus comprises a passage for the flowable material and a pump for flowing the flowable material through the passage at a predetermined speed. The apparatus further includes a pair of electrodes in the passage, the predetermined speed and the size of the electrodes being such that the flowable material remains between the electrodes for a predetermined duration of less than one second and an electrical power supply to apply a continuous high electrical potential to the electrodes to create the electrical field of a predetermined magnitude in the flowable material, the predetermined magnitude being such that the electric field electrocutes bacteria in the flowable material and yet produces no substantial joule heating therein.

DETAILED DESCRIPTION OF PREFERRED EMBODIMENTS OF INVENTION

Figure 1:
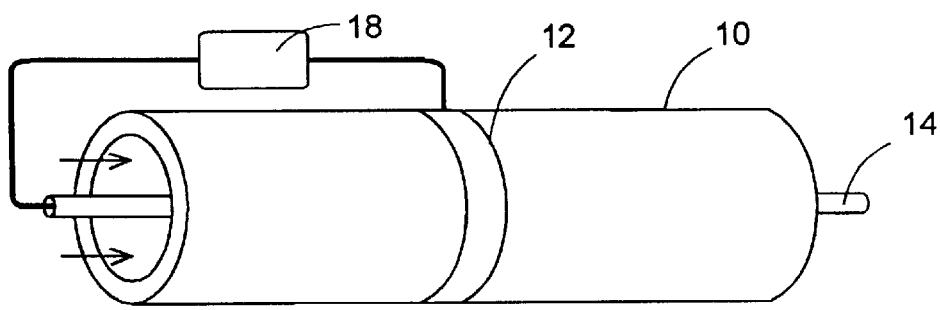
FIG. 1 shows schematically an arrangement of electrodes according to one embodiment.
Figure 2:
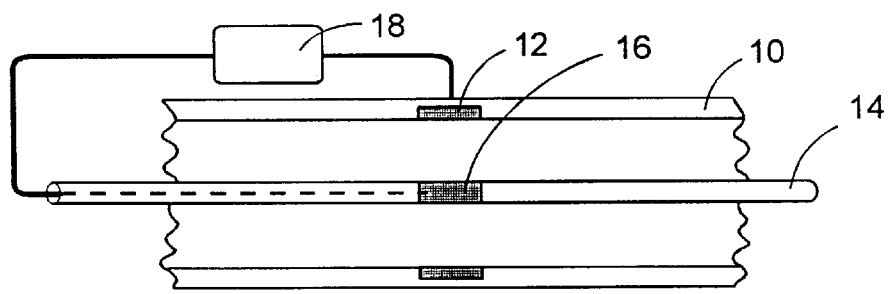
FIG. 2 is a cross-sectional view of FIG. 1 to show the relative location of the electrodes.

The current invention provides a unique method of applying high electric field for very short durations to fluids (any flowable material including semisolids, solid particles in liquids, gases, etc.). A fluid is forced to flow at a very high speed through a pair of closely spaced narrow electrodes across which a DC or AC voltage is continuously applied. Any element of fluid spends a time in the range of milliseconds to microseconds or less and thus effectively sees an electric pulse of a short duration, preferably less than 1 second. As an example, reference is made to FIG. 1 for one embodiment in which a conduit 10 is provided with an outer annular electrode 12 on its inner surface. An electrode support 14 is located coaxially with the conduit. As seen in FIG. 2, the electrode support is provided with an inner annular electrode 16 which is located coaxially with the outer annular electrode. FIG. 2 also illustrates more clearly a relative location of the annular electrodes. In this embodiment, the annular electrodes have the width of 1 mm and are separated from one another by 1 mm. The liquid is flowing at a rate of 10 m/s. Any element of flowing liquid will then spend only 100 microseconds in the space between the two electrodes. If the electric potential supplied by a power source 18 is applied across the electrode pair and the potential is 1000V, the liquid element will experience a field of 10KV/cm. Since the separation and width of the electrodes can be significantly smaller (or larger) and so can be the applied electric potential and the rate of liquid flow, the effective electric field pulse width and strength can be tailored to achieve the desired level of pasteurization. The duration of pulses applied to the fluid must be such that no substantial joule heating takes place in the fluid and yet the electric field strength must be sufficient to obtain the desired level of pasteurization. These parameters vary widely with the flowable material to be treated.

Figure 3:
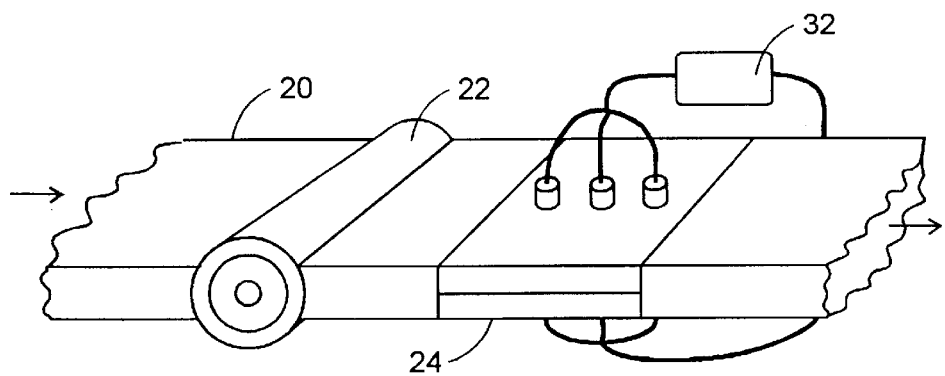
FIG. 3 shows a further embodiment of the invention.
Figure 4:
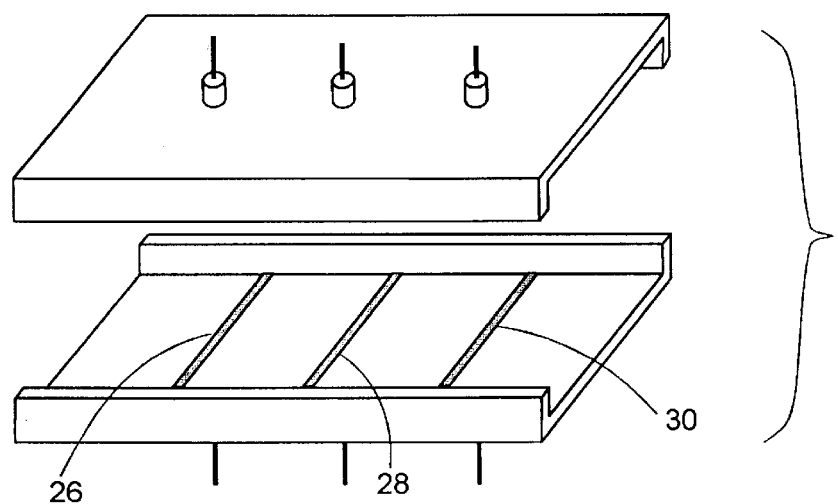
FIG. 4 is an exploded view of the treatment zone according to the embodiment shown in FIG. 3.

FIG. 3 shows another embodiment in which a rectangular conduit 20 is provided with a pump 22 to flow a liquid at a desired speed through a treatment zone 24. FIG. 4 shows the treatment zone more clearly in a cut-away view. A multiplicity of electrode pairs 26, 28 and 30 are positioned, each spaced apart at a desired distance from one another. The sizes, distance of electordes and the magnitudes of electric potentials can be adjusted to produce desired degree of pasterurization without generating substantial joule heating in the flowable material. A multiplicity of high electric field exposures supplied from a power source 32 can be imparted to the liquid to achieve the desired level of pasteurization. The technique can be also useful for certain gases and solids, as well as any combination of gases, liquids, and solids in any proportions.

Figure 5:
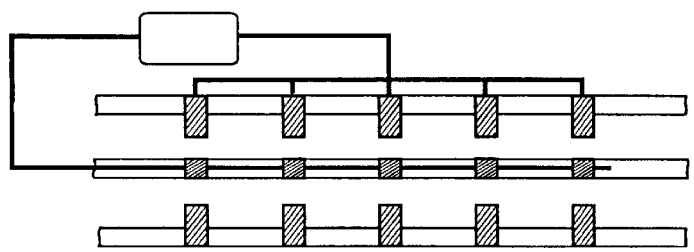
FIG. 5 is a cross-sectional view of a treatment zone according to a further embodiment of the invention.

FIG. 5 is a schematic cross sectional illustration of the treatment zone according to a further embodiment. In this arrangement, only the spaces where electrodes are present, have narrow spacing, whereas elsewhere the spacing is large. Therefore, the high fluid velocity (and concomitant high pressure drop) exists only in the region of electrodes. This leads to reduced energy requirement for pumping flowable materials.

AC waveforms are usually sinusoidal but sometimes saw tooth, rectangular and other non-sinusoidal periodic waveforms are found to be more useful in certain applications. Non-sinusoidal periodic waveforms are therefore included in the general definition of AC as used in this disclosure.

What is claimed is:

1. A method of electro-pasteurizing a flowable material comprising steps of:

passing the flowable material between a pair of electrodes at a speed, sizes of the electrodes and the speed being such that in passing the flowable material remains between the electrodes for a predetermined duration of less than one second, and applying a continuous high electrical potential between the pair of electrodes to create an electrical field of a predetermined magnitude such that the electric field electrocutes bacteria in the flowable material and yet produces no substantial joule heating therein.

2. The method according to claim 1, wherein the step of passing includes a step of exerting a pressure to the flowable material by a pump.

3. The method according to claim 2, further comprising a step of continuously applying to the electrodes one of the following, a high potential AC or a high potential DC or a combination of the both.

4. The method according to claim 3 comprising a further step of periodically interrupting the step of applying the continuous high electrical potential.

5. The method according to claim 1, further comprising steps of:

performing the steps recited in claim 1 with two or more pairs of electrodes in sequence.

6. The method according to claim 5, wherein the step of passing includes a step of exerting a pressure to the flowable material by a pump.

7. The method according to claim 6 comprising a further step of periodically interrupting the step of applying the continuous high electrical potential.

8. The method according to claim 6, further comprising a step of continuously applying to each pair of the electrodes one of the following, a high potential AC or a high potential DC or a combination of the both.

9. The method according to claim 8, wherein the continuous high potential AC or DC is of different values.

10. An electro pasteurization apparatus for a flowable material comprising:

a passage means for the flowable material;

a pump for flowing the flowable material through the passage means at a predetermined speed:

a pair of electrodes in the passage means, the predetermined speed and the size of the electrodes being such that the flowable material remains between the electrodes for a predetermined duration of less than one second; and an electrical power supply to apply a continuous high electrical potential to the electrodes to create the electrical field of a predetermined magnitude in the flowable material, the predetermined magnitude being such that the electric field electrocutes bacteria in the flowable material and yet produces no substantial joule heating therein.

11. The electro-pasteurization apparatus for a flowable material according to claim 10, wherein the continuous high electrical potential is an AC or DC.

12. The electro-pasteurization apparatus for a flowable material according to claim 11, wherein the passage means comprises a cylindrical conduits having a concentric electrode support and one electrode is provided on the cylindrical conduit and another on the electrode support, the distance between the electrodes is smaller than that of the conduit and the electrode support.

13. The electro-pasteurization apparatus for a flowable material according to claim 12, comprising more than one pair of electrodes provided on the cylindrical conduit and the electrode support.

14. The electro-pasteurization apparatus for a flowable material according to claim 13, wherein the passage means comprises a conduit having a rectangular cross section.

15. The electro-pasteurization apparatus for a flowable material according to claim 10, further comprising:

a plurality of pairs of electrodes in the passage means, and electrical power supply to apply a continuous high electrical potential to each pair of the electrodes to create the electrical field of a predetermined magnitude, the duration and magnitude being such that the electric field kills bacteria and yet produces no substantial joule heating therein.

16. The electro-pasteurization apparatus for a flowable material according to claim 15, wherein the passage means comprises a conduit having a rectangular cross section.

* * * * *